(12) United States Patent
Muin et al.

(10) Patent No.: US 6,776,457 B2
(45) Date of Patent: Aug. 17, 2004

(54) VEHICLE SEAT PARTICULARLY FOR AIRCRAFT

(75) Inventors: Andrew Muin, Harsefeld (DE); Markus Schumacher, Buxtehude (DE); Frank-Heinrich Schoenenberg, deceased, late of Schwäbisch Hall (DE), by Beate Schoenenberg, legal representative; Christian Majunke, Rostock (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/402,898

(22) Filed: Mar. 28, 2003

(65) Prior Publication Data
US 2003/0209929 A1 Nov. 13, 2003

(30) Foreign Application Priority Data
Mar. 28, 2002 (DE) .......... 102 14 104

(51) Int. Cl.[7] ............ B60N 2/02
(52) U.S. Cl. ............ 297/331; 297/232; 297/362.13; 297/411.32
(58) Field of Search ........ 297/232, 331, 297/335, 362.13, 411.32, 411.38

(56) References Cited

U.S. PATENT DOCUMENTS

| | | | | |
|---|---|---|---|---|
| 3,037,812 A | * | 6/1962 | Monroe | 297/362.13 |
| 3,145,052 A | * | 8/1964 | Charles | 297/354.1 |
| 3,594,037 A | * | 7/1971 | Sherman | 297/14 |
| 4,099,780 A | * | 7/1978 | Schmidhuber | 297/411.26 |
| 5,829,836 A | * | 11/1998 | Schumacher et al. | 297/257 |
| 6,361,114 B1 | * | 3/2002 | Rumler | 297/411.39 |
| 6,481,798 B2 | * | 11/2002 | Romca et al. | 297/354.1 |
| 6,669,295 B2 | * | 12/2003 | Williamson | 297/362.13 |

FOREIGN PATENT DOCUMENTS

| | | |
|---|---|---|
| DE | 36 38 231 A1 | 5/1988 |
| DE | 196 55 068 C2 | 4/1997 |
| DE | 197 42 773 A1 | 4/1999 |

* cited by examiner

*Primary Examiner*—Peter M. Cuomo
*Assistant Examiner*—Joseph Edell
(74) *Attorney, Agent, or Firm*—Laurence A. Greenberg; Werner H. Stemer; Gregory L. Mayback

(57) ABSTRACT

A vehicle seat, more particularly aircraft seat, includes a seat bottom and a seat back disposed in a seat frame. The seat bottom can be folded down from a first near vertical position (I) into a second near horizontal position (II). This results in a comparatively simple, lightweight construction featuring good accessibility to several vehicle seats configured abreast and/or in rows.

33 Claims, 8 Drawing Sheets

VEHICLE SEAT PARTICULARLY FOR AIRCRAFT

BACKGROUND OF THE INVENTION

Field of the Invention

The invention relates to a vehicle seat, more particularly to an aircraft seat, including a seat bottom and a seat back disposed in a seat frame.

One such vehicle seat is described in published, non-prosecuted German Patent Application No. DE 36 38 231 A1. Both the seat back and the seat bottom of this vehicle seat mainly serving as an aircraft seat are adjustable. The seat back and seat bottom are connected to each other by a two-armed lever such that when the seat back is reclined the seat bottom is lowered in a rear section facing the seat back while remaining practically unchanged in a front section, in thus providing relatively high comfort for a seated occupant. The disadvantage of this known vehicle seat is the relatively complicated and heavyweight structure. Apart from this, when several vehicle seats are disposed abreast in rows, as is usually the case when employed as aircraft seats, cleaning is difficult due to the limited access space between the vehicle seats.

SUMMARY OF THE INVENTION

It is accordingly an object of the invention to provide a vehicle seat particularly for aircraft that overcomes the hereinafore-mentioned disadvantages of the heretofore-known devices of this general type and that allows, in a relatively simple and lightweight construction, good accessibility to several vehicle seats disposed abreast and/or in rows.

With the foregoing and other objects in view, there is provided, in accordance with the invention, a vehicle seat including a seat bottom, a seat back, a seat frame, and a pintle. The seat bottom is pivotable from a first near vertical position I into a second near horizontal position II. The seat back has a mounting clip. The seat frame holds the seat bottom and the seat back and includes legs, a cantilevered supporting beam supported by the legs, and two seat dividers. The seat dividers frame the seat back, are secured to the supporting beam, and have a respective mounting bush. The seat bottom further has supporting arms hingedly pivoting on the seat dividers in order to pivot the seat bottom. The support arm has a hole formed therein. The pintle has a first and second end section with a middle section therebetween. The first end section is rotatably mounted on the mounting bush. The second end section is mounted in the mounting clip of the seat back. The middle section is disposed in the opening of the supporting arm.

To achieve this objective with a vehicle seat, the vehicle seat has a seat bottom that is foldable about a horizontal axis from a first near vertical position into a second near horizontal position.

The vehicle seat configured in this way as a folding seat now ensures, due to the foldable seat bottom, good accessibility even when several vehicle seats are relatively closely spaced in a row. Due to the good accessibility, both simple cleaning and also enhanced comfort in taking the seat is now assured. The vehicle seat in accordance with the invention is thus especially suitable as an aircraft seat.

Thus, for a simple and lightweight construction, it is of advantage when the seat frame includes at least one cantilevered supporting beam supported by the legs of the frame and at least two seat dividers framing the seat back and secured to the supporting beam. Such a seat frame includes relatively few components to thus ensure speedy professional assembly.

It is furthermore particularly of advantage to provide the seat bottom with supporting arms hinged to pivot on the seat dividers for folding the seat bottom. The supporting arms may be provided either as separate components connected to the seat bottom or fabricated integrally with the seat bottom.

The latter solution particularly adds to the functional integration in thus facilitating assembly.

In accordance with one preferred aspect of the vehicle seat in accordance with the invention, the seat back is adjustable on the seat frame and overcomes the loading of a spring. The spring is preferably a gas spring and permits speedy, facilitated return of the adjustable seat back from the its reclined position to its starting position.

To ensure simple construction, it is of advantage to provide a pintle rotatably mounted at a first end section in a mounting bush disposed in the seat dividers and either rotatably or non-rotatably mounted at a second end section in a mounting clip disposed on the seat back. The pintle permits adjusting the seat back if the second end section is connected non-rotatably, for instance positively with the mounting clip disposed on the seat back. In this case, the seat back is pivoted by turning the pintle.

Preferably, the pintle includes, between the first end section and the second end section, a middle section configured either rotatably or non-rotatably in an opening of the supporting arms. The pintle thus additionally mounts to the seat bottom; this makes for enhanced functional integration. Similar to the mounting situation of the seat back, the seat bottom can then be pivoted by turning the pintle when the middle section is non-rotatably connected to the opening of the supporting arms.

In one advantageous aspect of the vehicle seat in accordance with the invention, the spring is disposed on a bracket, secured to the supporting beam, and connected to an adjusting lever coupled non-rotatably to the first end section of the pintle. Disposing the spring on the bracket adds to the simple configuration in thus making for more cost-effective fabrication of the supporting beam. The adjusting lever permits rotation of the pintle. Due to the adjusting lever being connected to the spring the pintle and thus the seat back can be adjusted in overcoming the loading of the spring.

It is furthermore of advantage for added comfort of the vehicle seat occupant to provide an armrest hinged to the seat dividers. Hinging the armrest ensures that when the seat bottom is folded, i.e. vertical, the access space materializing between two vehicle seats in a row is not obstructed by the armrest.

Simplified assembly of the armrest is achievable to advantage when the armrest is composed of a lower shell and upper shell surrounding the upper end of the seat dividers. The reason for this is that the armrest is thus configured two-part in enabling it to be applied to the seat dividers relatively simply.

In accordance with one preferred embodiment of the vehicle seat in accordance with the invention the seat bottom can be pivoted from the first position into the second position in overcoming the loading of a spring, preferably a gas spring. Such a configuration ensures that, when the vehicle seat is vacated, it is always in the folded up position. For good construction, it is of advantage to dispose the spring on the seat divider and connect it to a pivot lever that is non-rotatably coupled to the first end section of the pintle. This enables the force generated by the spring to be converted into a moment loading the pintle which pivots the seat bottom into its first position.

It has additionally been found to be of advantage to hinge a coupling rod, guided by a guide pin in a slider disposed on the armrest. This rod couples the seat bottom to the armrest in thus assuring that also the armrest is folded up when the seat bottom is located in the first position. Providing the slider makes sure that the armrest can be folded up even when the seat bottom is located in its second horizontal position.

A rugged construction of the supporting beam is configured with a round cross-section that is preferably oval.

Particularly preferred is a supporting beam having an oval cross-section that is hollow and in which the larger half-axis is oriented horizontally; the moment of resistance in such a supporting beam is favorable for normal seat loading.

A lightweight construction of the supporting beam utilizes carbon-fiber reinforced plastics to produce a relatively low density but high strength. The legs of the frame and/or the seat bottoms and/or the brackets by contrast are preferably made of aluminum, more particularly milled and secured to the supporting beam preferably by clamp fastener. Using aluminum reduces the weight while strengthening the seat frame. Clamp fasteners ensure reliable fastening of the frame legs, seat dividers and brackets to the supporting beam even when the materials involved differ.

In another preferred aspect of the vehicle seat in accordance with the invention, the seat bottom includes a seat pan preferably made of carbon-fiber reinforced plastics and with a cushion of elastomeric material. While the seat pan endows the seat bottom with high strength, the cushion enhances the seating comfort of the vehicle seat occupant. By known ways, the cushion can be clad with a cover.

In accordance with a further object of the invention, to ensure good restraint of the occupant in the event of a crash, the seat pan features an upper surface provided ramped for anti-submarining the occupant, i.e. preventing the passenger from slipping forwards in a crash situation.

It is also of advantage to provide the seat pan with a stow-away serving, for example, to accommodate a life jacket when the vehicle seat is provided in an aircraft.

In another preferred construction of the vehicle seat, the seat pan includes a recess matching the contour of the supporting beam. In the recess, the seat pan rests on the supporting beam in the second position of the seat bottom. When the supporting beam has an oval cross-section, the recess is thus substantially scalloped. The seat pan resting on the supporting beam in the second position is effectively supported while the supporting beam serves as a stop for the seat pan pivoted by the supporting arms so that the seat bottom can be precisely located in its second position in relieving the load on the pintles.

In still another further embodiment of the vehicle seat, it is additionally proposed that the seat pan includes a recess for the brackets so that the brackets secured to the supporting beam do not obstruct the pivoting freedom of the seat bottom.

In conclusion, the vehicle seat in accordance with the invention includes several, preferably three, seat bottoms and seat backs configured abreast on the supporting beam. The vehicle seat thus represents a seating bench as employed as a rule in aircraft.

Other features that are considered as characteristic for the invention are set forth in the appended claims.

Although the invention is illustrated and described herein as embodied in a vehicle seat, more particularly aircraft seat, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
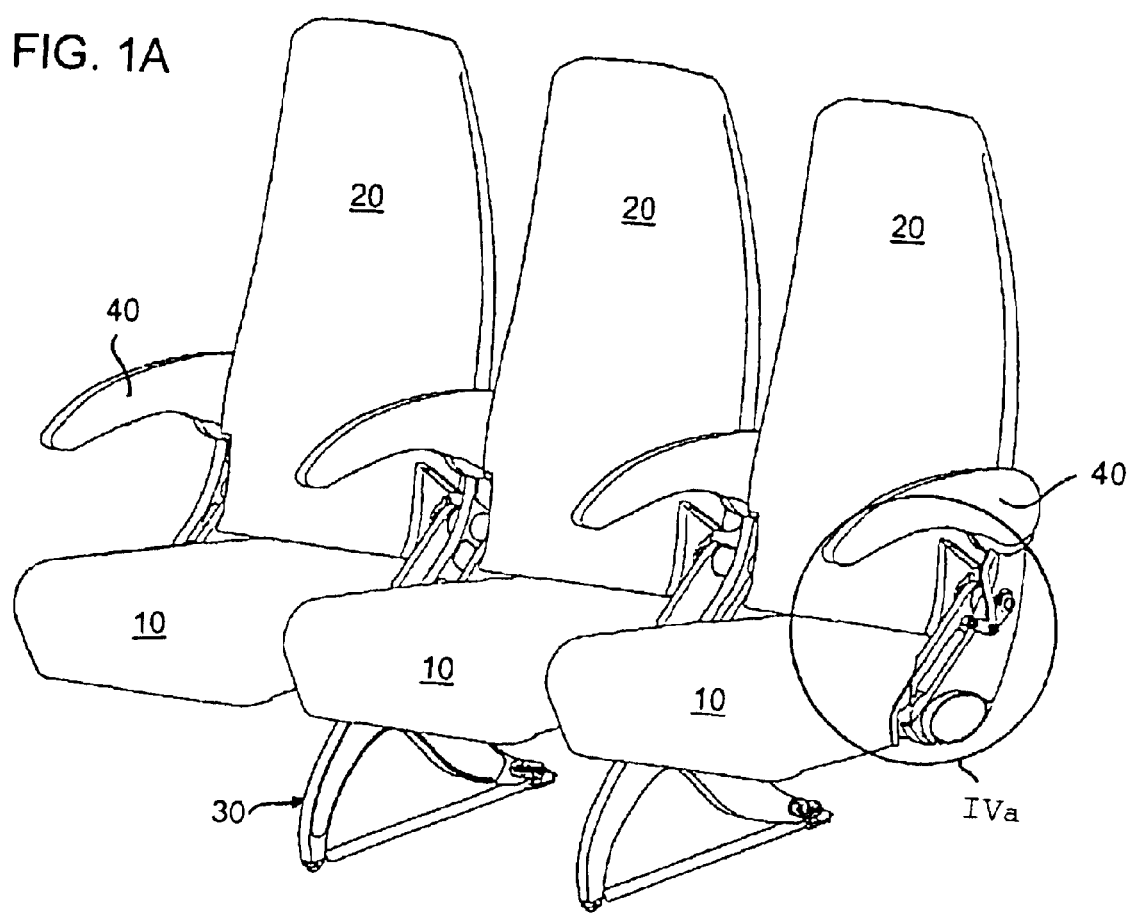
FIG. 1A is a perspective view showing an aircraft seat in accordance with the invention configured as a seating bench with three seats abreast.
Figure 1B:
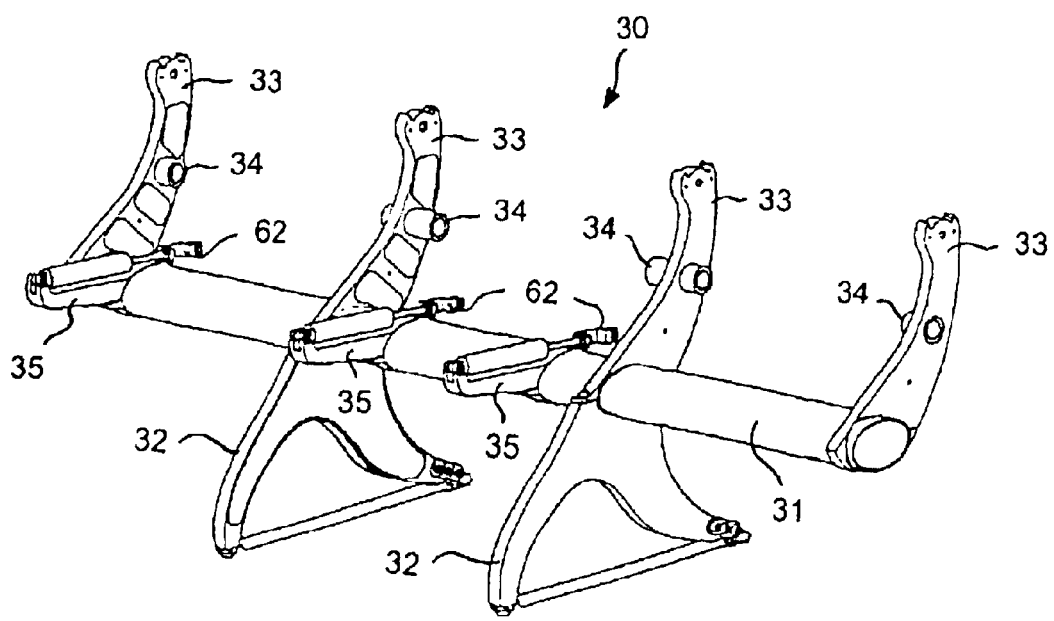
FIG. 1B is a perspective view showing a seat frame of the aircraft seat shown in FIG. 1A.

Referring now to the figures of the drawings in detail and first, particularly to FIG. 1 thereof, there is shown an aircraft seat that is configured as a seating bench for seating several occupants. The seating bench includes a seat frame 30 on which three seat bottoms 10 and three seat backs 20 are configured abreast. As particularly evident from FIG. 1B, the seat frame 30 includes a cantilevered supporting beam 31 supported by frame legs 32. Furthermore, the seat frame 30 is provided with seat dividers 33 for side mounting the seat backs 20. The supporting beam 31, which is configured substantially oval in cross-section, is made of carbon-fiber reinforced plastics while the frame legs 32 as well as the seat divider 33 are milled from aluminum. Due to the different materials involved, the frame legs 32 and the seat dividers 33 are secured to the supporting beam 31 by a clamp fastener. For this purpose, the seat dividers 33 can be connected to the frame legs 32 as evident from FIG. 1B.

Referring now to FIG. 2A to FIG. 2D, there is illustrated how the seat back 20 is secured to the seat frame 30. As evident from FIG. 2A, the seat back 20 is configured to be reclinable relative to the seat frame 30. For this purpose, pintles 50 find application permitting pivoting of the seat back 20. At a first end of section 51, the pintles 50 are rotatably mounted in a mounting bush 34 located in one of the seat dividers 33, as evident from FIG. 2B and FIG. 2C. A second end section 52b opposite the first end section 51 is non-rotatably connected to a mounting clip 21 located on the seat back 20. For this purpose, the mounting clip 21 features flats 22 positively connected to flats 54 of the second end section 52b. Furthermore, the first end section 51 is non-rotatably coupled to an adjuster lever 55, the action of which results in the seat back 20 being reclined. For the non-rotatable coupling of first end section 51 and adjuster lever 55 flats 56, 57 are provided that result in a positive connection between the first end section 51 and adjuster lever 55 in the interior of the mounting bush 34.

Figure 2A:
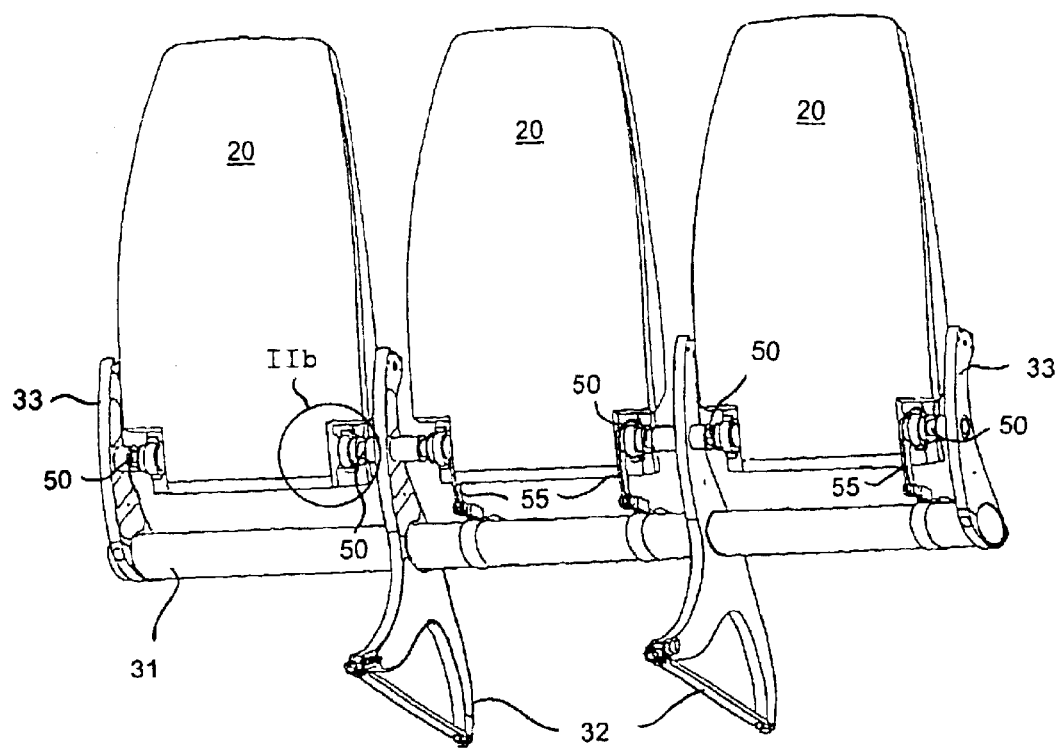
FIG. 2A is a rear view showing the seat frame shown in FIG. 1B with the seat backs fitted.
Figure 2B:
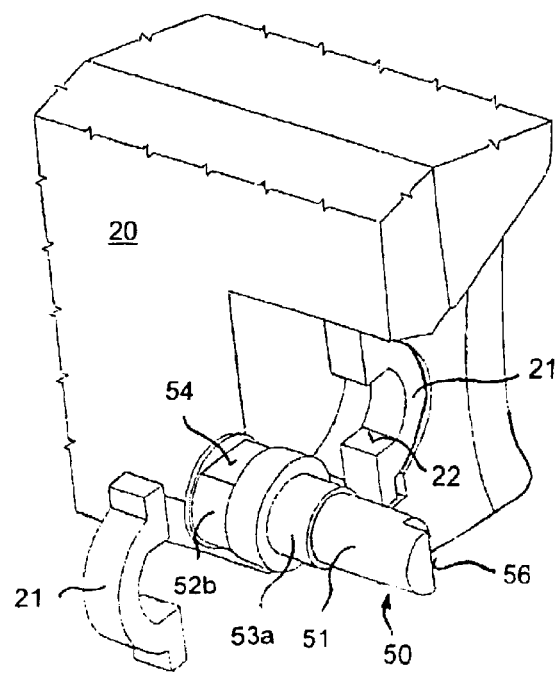
FIG. 2B is a close-up perspective view of the detail identified IIB in FIG. 2A.
Figure 2C:
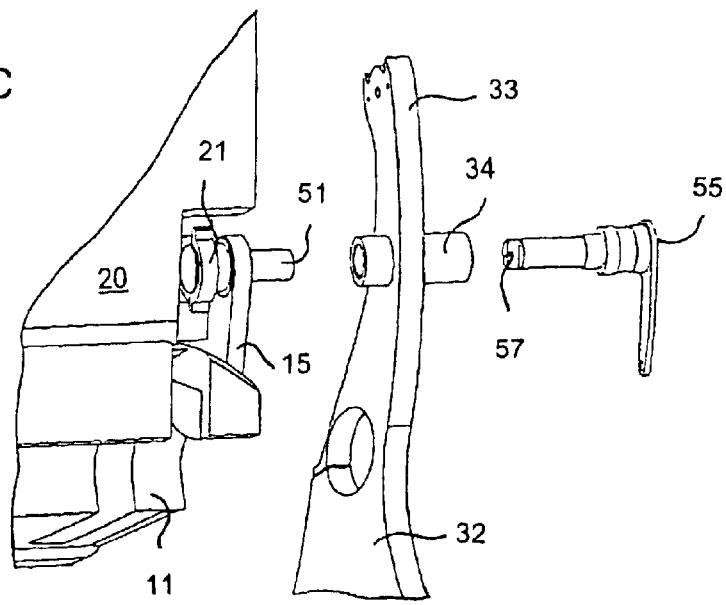
FIG. 2C is an exploded view of the fastener securing the seat back to the seat frame.
Figure 2D:
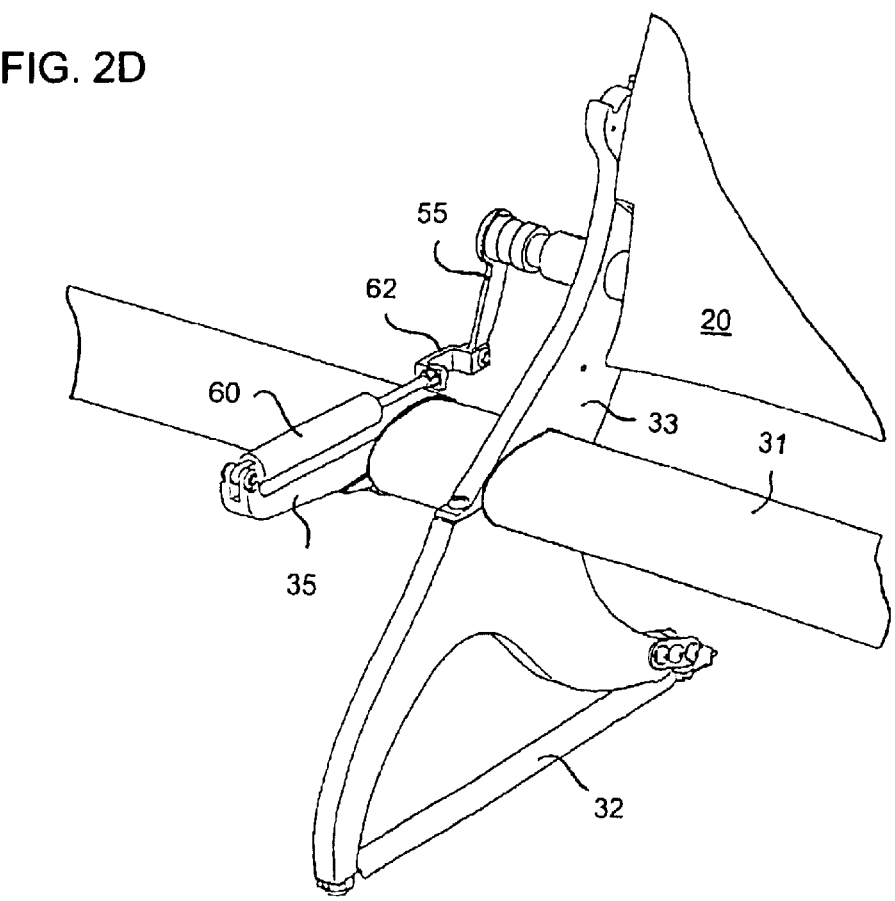
FIG. 2D is a perspective view of the mechanism for reclining the seat back.

FIG. 2D illustrates how the adjuster lever 55 is connected to a gas spring 60 by a connecting link 62. The gas spring 60 is disposed on a bracket 35 milled from aluminum, which is secured to the supporting beam 31 by a clamp fastener, thus enabling the seat back 20 to be reclined by overcoming the loading of the gas spring 60. For reclining, the seat back 20 or a drive (not shown) but known may be provided; the seat back 20 engages, for example, the connecting link 62.

FIGS. 3A to 3D illustrate the seat bottom 10 that is secured to the seat frame 30. As particularly evident from FIG. 3B, the seat bottom 10 includes a seat pan 11 made of carbon-fiber reinforced plastics. The seat pan 11 is provided at an upper surface 12 with a ramped depression 13 for anti-submarining the occupant, i.e. preventing him from slipping forwards in a crash situation. The seat pan 11 is furthermore provided with a stow-away 17 for accommodating a life-jacket, for example. The seat pan 11 supports with its upper surface 12 a cushion 14 that is clad with a cover by conventional ways. The cover conceals the stow-away 17, as evident from FIG. 3C. To permit instant access to the life-jacket in the stow-away 17, the cover is provided with a rip-cord with which the cover can be removed from the stow-away 17 when required.

Molded on the seat pan 11 are side supporting arms 15 hinged pivoted on the seat dividers 33. For this purpose, the supporting arms 15 are provided with openings 16a, 16b in which a middle section 53a, 53b of the pintles 50 is rotatably mounted to enable the seat bottom 10 to be folded down from a first near vertical position I into a second near horizontal position II about the pintle 50 extending horizontal.

Figure 3A:
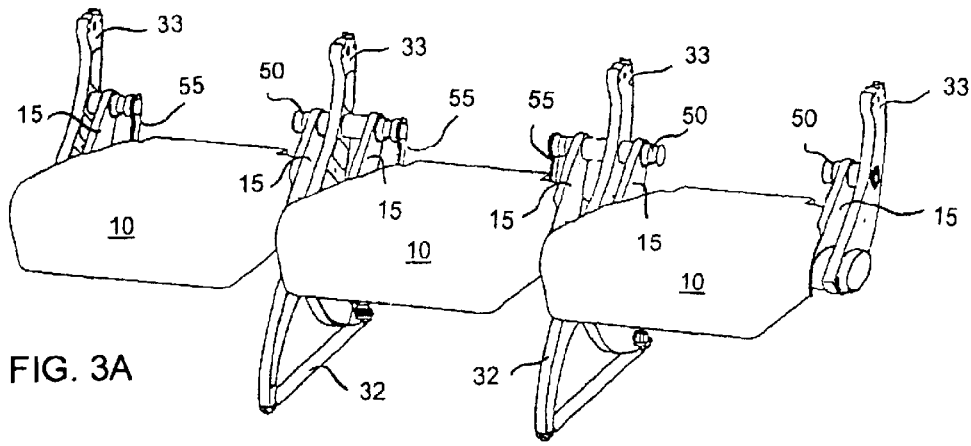
FIG. 3A is a perspective view of the seat frame shown in FIG. 1B with the seat bottoms fitted.
Figure 3B:
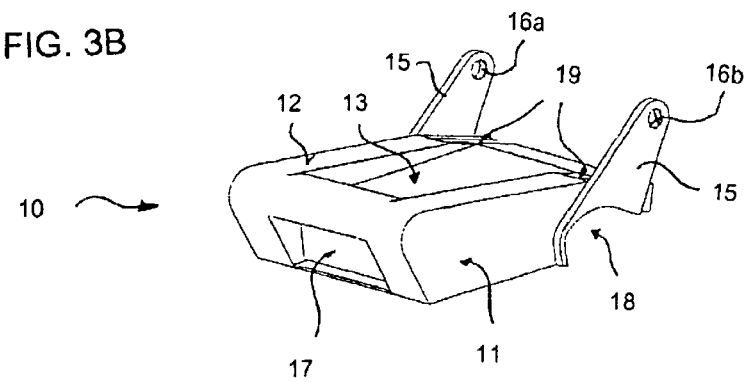
FIG. 3B is a partial perspective view of a seat bottom.
Figure 3C:
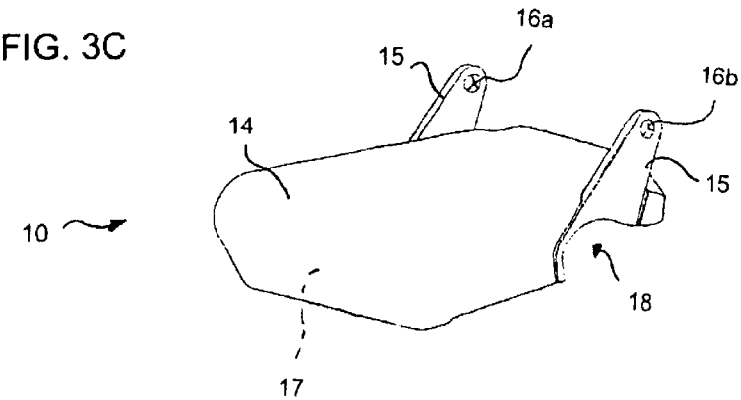
FIG. 3C is a partial perspective view of the seat bottom shown in FIG. 3B with a cushion.
Figure 3D:
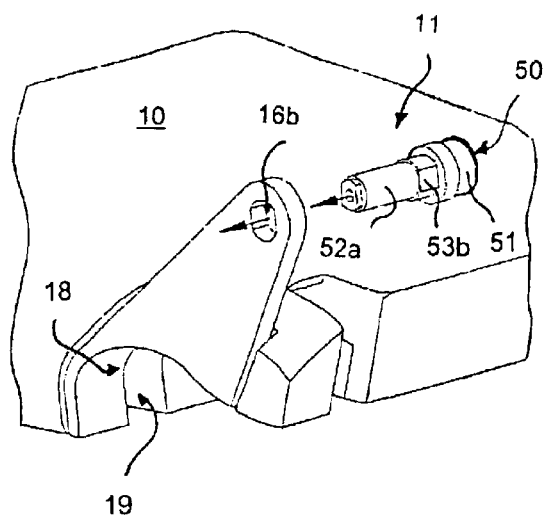
FIG. 3D is a perspective, exploded view showing a seat bottom fastener.

The supporting arm 15 as shown on the right in FIG. 3A includes, unlike the other supporting arms 15, an opening 16b provided with flats. As evident from FIG. 3D, the middle section 53b of the pintle 50 extending through the opening 16b, which likewise correspondingly includes flats producing a positive connection between the pintle 50 and the supporting arm 15. Thus, turning the pintle 50 results in the seat bottom 10 shown on the right in FIG. 3A being folded down from the first position I into the second position II whereas the two other seat bottoms 10 are to be folded by gripping the seat pan 11.

Figure 4A:
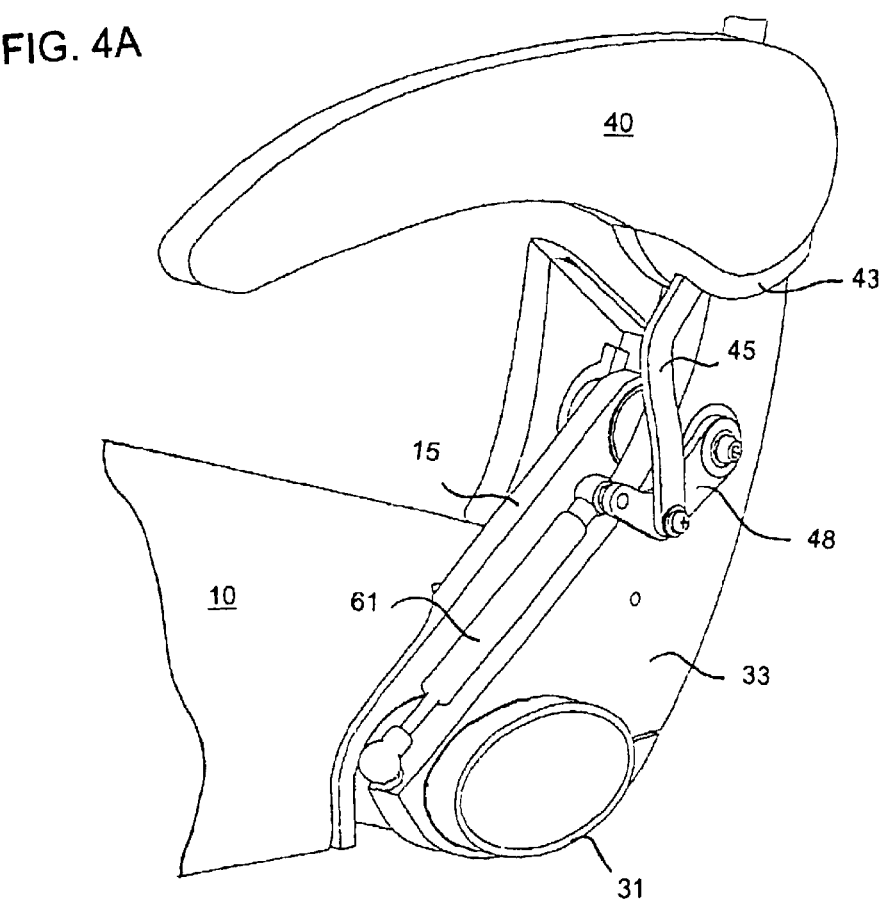
FIG. 4A is an enlarged partial view of the detail identified IVA in FIG. 1A.
Figure 4B:
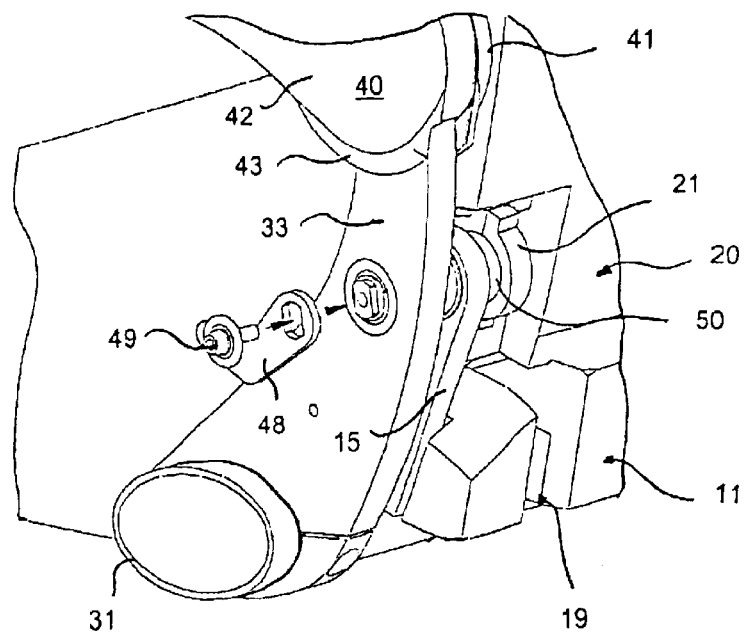
FIG. 4B is a partial exploded view of a pivot lever fastener.
Figure 4C:
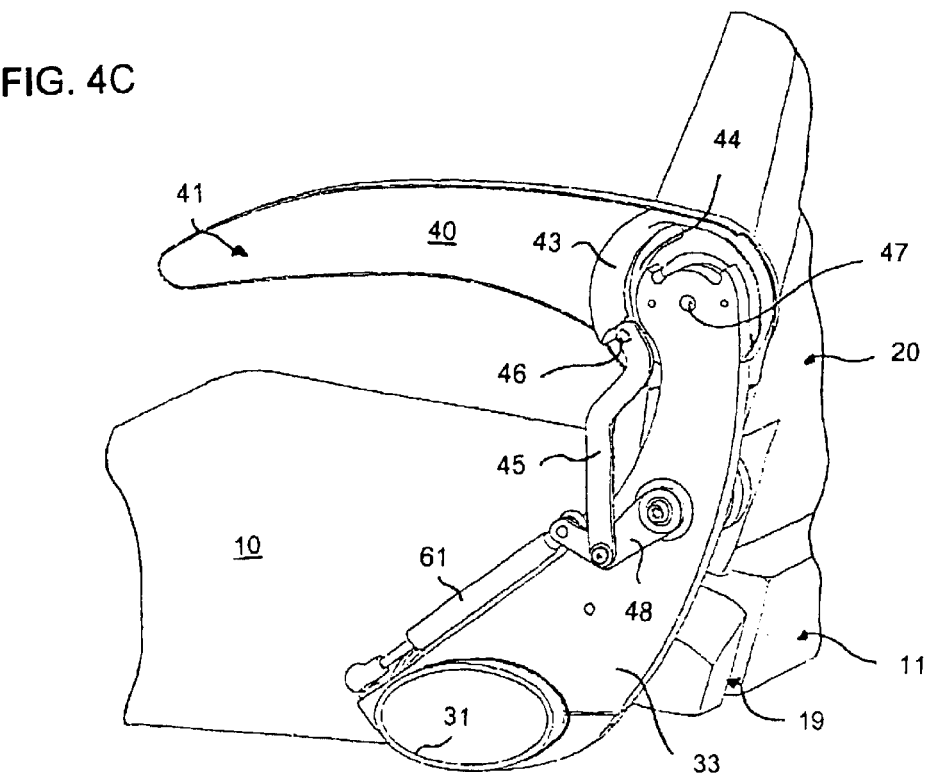
FIG. 4C is a side view showing the mechanism for adjusting an armrest.

FIGS. 4A to 4C illustrate the configuration of an armrest 40 hinged to the seat dividers 33. The armrest 40 includes a lower shell 41 and an upper shell 42 that clasp the upper end of the seat dividers 33, as evident from FIG. 4B. In this configuration, the armrest 40 is rotatably mounted by a joint pin 47 on the seat dividers 33. To prevent trapping, a cover 43 is provided in the region of the upper end of the seat dividers 33 to cover the gap automatically materializing between the lower shell 41 and the upper shell 42 when pivoting the armrest 40.

A slider 44 is disposed in the interior of the armrest 40 and forms a variable fulcrum for a coupling rod 45 guided by a guide pin 46 in the slider 44. The coupling rod 45 is hinged to a pivot lever 48 non-rotatably coupled to the first end section 51 of the pintle 50 of the seat shown on the right in FIGS. 1a and 3a. For the non-rotatable coupling the first end section 51 is positively connected to the pivot lever 48 as evident more particularly from FIG. 4B. A screw 49 axially secures the pivot lever 48 and the first end section 51. The screw 49 is screwed without a tapping of the first end section 51.

At its end, opposite the first end section 51, the screw 49 is connected to a gas spring 61 disposed on the seat divider 33. The gas spring 61 permits folding of the pintle 50 and thus the seat bottom 10, which is positively connected from the vertical position I into the horizontal position II when overcoming the return force produced by the gas spring 61. This ensures that the seat bottom 10 is always returned up into the vertical position I when the seat is vacated.

The coupling rod 45 ensures that the armrest 40 follows the movement of the seat bottom 10. Pivoting the armrest 40 irrespective of the seat bottom 10 is assured by the slider 44: meaning that the armrest 40 can be pivoted up into the vertical position when the seat bottom 10 is folded down to facilitate the occupant getting up from the seat, for example.

Figure 5A:
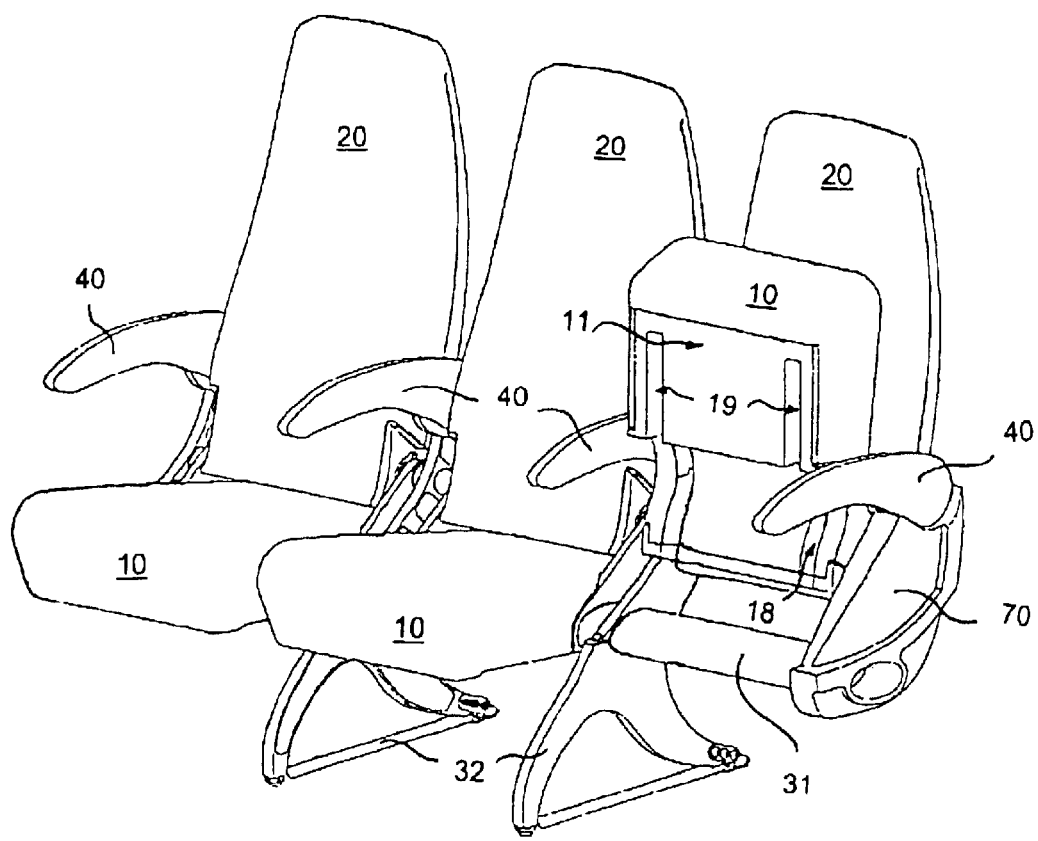
FIG. 5A is a perspective of the aircraft sea shown in FIG. 1A with the seat bottom and armrest folded.
Figure 5B:
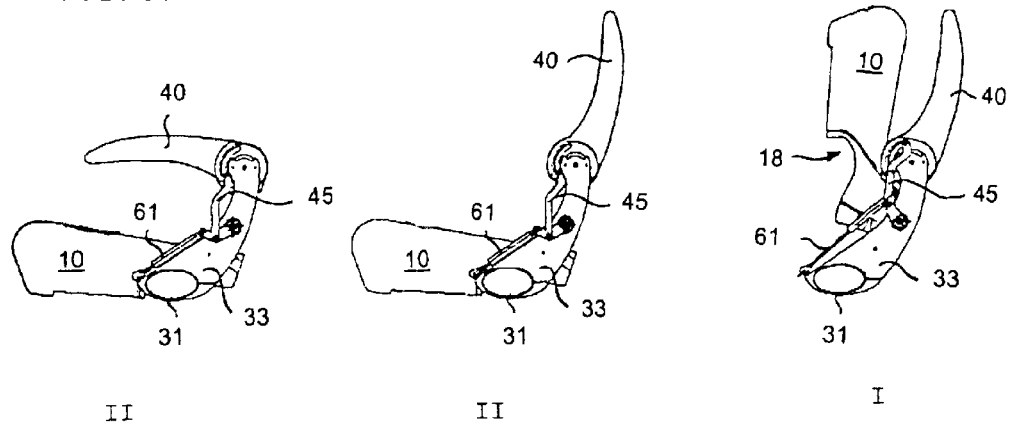
FIG. 5B is a side view showing various positions of the seat bottom and armrest.
Figure 5C:
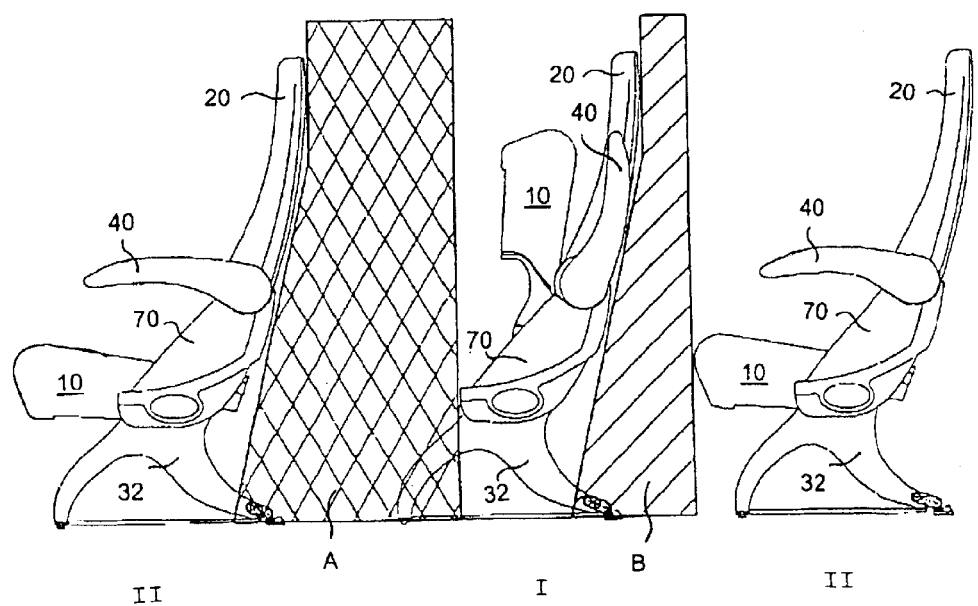
FIG. 5C is a side view of a row of aircraft seats showing an access space between the aircraft seats with the seat bottom and armrest folded down and folded up.

FIGS. 5A to 5C illustrate the various positions which the seat bottom 10 and armrest 40 can assume. Especially FIG. 5B clarifies that the armrest 40 can be folded up irrespective of the seat bottom 10. Evident from FIG. 5C is the extra accessibility made available by folding up the seat bottom 10 and armrest 40 between two seat backs in a row. Thus, access space B between two seat backs in a row with the seat bottom 10 and armrest 40 folded down is significantly less than the access space A with the seat bottom 10 and armrest 40 folded up. Access space A thus ensures good accessibility for facilitating cleaning and the occupant comfortably taking a seat. For this purpose, actual practice has proven it to be sufficient to merely provide the seat siding the aisle with a gas spring 61 to automatically return the seat bottom 10 folded up into the vertical position I while for the other two seats it is sufficient when the seat bottom 10 can be folded up manually from the horizontal position II into the vertical position I, for instance, when cleaning is done. However, by the seat siding the aisle automatically assuming the vertical position I, this makes it possible to use the exposed supporting beam 31 as a step in gaining access to the overhead stow-away compartments for luggage in the aircraft, for example, as is particularly evident from FIG. 5A.

Referring now to FIG. 5A, there is illustrated in addition how no bracket 35 is provided for the gas spring 60 which would impair accessibility. This gas spring 60 for reclining the seat back 20 of the seat siding the aisle is disposed on a bracket 35 located in the region of the seat back 20, as is evident from FIGS. 1B and 2A. In the horizontal position II of the folded seat bottom 10, the bracket 35 includes the gas spring 60 and rests in the recesses 19 provided on the underside of the seat pan 11 as evident from FIGS. 3b and 5a. This prevents the pivoting freedom of the seat bottom 10 from being restricted by the bracket 35. Provided furthermore on the underside of the seat pan 11 is a recess 18 adapted to the contour of the supporting beam 31. In the recess 18 the seat pan 11 rests on the supporting beam 31 in the horizontal position II of the seat bottom 10 as evident from, for example, from FIG. 5B. The recess 18 has a substantially scalloped contour. The recess 18 serves as a stop for the seat pan 11 so that the seat bottom 10 can be correctly located in the horizontal position II. The seat bottom 10 is supported in the recess 18 on the supporting beam 31 so that the pintles 50 are relieved of load in the usually loaded horizontal position II of the seat bottom 10. This enables the pintles 50 to be dimensioned smaller or additionally directly loaded, for example, by fold-down tables hinged on the pintles 50 on the rear side of the seat backs 20.

The aircraft seat as cited above is characterized by a comparatively simple, lightweight construction. The reason for this is the use of materials such as, for example, aluminum or carbon-fiber reinforced plastics that, for a relatively low density, excel with high strength. For another, assigning multiple functions to the individual components by, for instance, simultaneously mounting the seat bottom 10 and the seat back 20 on the pintle 50 reduces the number of components needed in thus ensuring speedy assembly as well as a compact and modular configuration. Furthermore, the aircraft seat as described above is characterized by forming a seating bench with relatively good accessibility. The reason for this is primarily the pivoted configuration of the seat bottom 10 resulting in a folding aircraft seat providing a relatively large access space A between the rows of the seat backs with the seat bottom 10 folded. Since the seat in the bench siding the aisle automatically folds up when vacated, unobstructed passage through the aisle of the aircraft is assured. Last but no least, the aircraft seat as described above adds to accident prevention by eliminating potential hazards to the occupant, for example trapping, by including the cover 43 or a cladding 70 of the seat divider 33 as evident from the FIGS. 5a and 5c.

We claim:

1. A vehicle seat, comprising:
   a seat bottom being pivotable from a first near vertical position into a second near horizontal position;
   a seat back having a mounting clip;
   a seat frame holding said seat bottom and said seat back and including legs, a cantilevered supporting beam supported by said legs, and two seat dividers framing said seat back, being secured to said supporting beam, and having a respective mounting bush;
   said seat bottom further having supporting arms hingedly pivoting on said seat dividers in order to pivot said seat bottom, said supporting arm having a hole formed therein;
   a pintle having a first and second end section with a middle section therebetween, said first end section being rotatably mounted on said mounting bush, said second end section being mounted in said mounting clip of said seat back, and said middle section being disposed in said opening of said supporting arm.

2. The vehicle seat according to claim 1, wherein said vehicle seat is an aircraft seat.

3. The vehicle seat according to claim 1, wherein said second end section is rotatably mounted in said mounting clip of said seat back.

4. The vehicle seat according to claim 1, wherein said second end section is non-rotatably mounted in said mounting clip of said seat back.

5. The vehicle seat according to claim 1, wherein said middle section is rotatable in said opening of said supporting arm.

6. The vehicle seat according to claim 1, wherein said middle section is non-rotatable in said opening of said supporting arm.

7. The vehicle seat according to claim 1, further comprising a spring with a loading connected to said seat back, said seat back being adjustable on said seat dividers by overcoming the loading of said spring.

8. The vehicle seat according to claim 7, wherein said spring is a gas spring.

9. The vehicle seat according to claim 7, further comprising:
   a bracket secured to said supporting beam and connected to said spring; and
   an adjusting lever connected to said bracket and coupled non-rotatably to said first end section of said pintle.

10. The vehicle seat according to claim 1, further comprising an armrest hinged to said seat dividers.

11. The vehicle seat according to claim 10, wherein:
    said seat dividers have an upper end; and
    said armrest includes a lower shell and an upper shell surrounding said upper end of said seat dividers.

12. The vehicle seat according to claim 1, further comprising a spring with a loading connected to said seat bottom; said seat bottom being pivotable from the first position into the second position by overcoming the loading of said spring.

13. The vehicle seat according to claim 12, wherein said spring is a gas spring.

14. The vehicle seat according to claim 12, further comprising a pivot lever connected to said seat divider by said spring and being non-rotatably coupled to said first end section of said pintle.

15. The vehicle seat according to claim 14, wherein:
    said armrest has a slider formed therein;
    a guide pin is disposed in said slider; and
    a coupling rod is connected to and guided by said guide pin in said slider and hinged to said pivot lever.

16. The vehicle seat according to claim 1, wherein said supporting beam has a round cross-section.

17. The vehicle seat according to claim 1, wherein said supporting beam has an oval cross-section.

18. The vehicle seat according to claim 1, wherein said supporting beam is made of carbon-fiber reinforced plastics.

19. The vehicle seat according to claim 1, further comprising a clamp fastener fastening said legs of said frame to said supporting beam, said legs being made of aluminum.

20. The vehicle seat according to claim 19, wherein said legs are milled from aluminum.

21. The vehicle seat according to claim 1, further comprising a clamp fastener fastening seat dividers to said supporting beam, said seat dividers being made of aluminum.

22. The vehicle seat according to claim 21, wherein said seat dividers are milled from aluminum.

23. The vehicle seat according to claim 1, further comprising a clamp fastener fastening said brackets to said supporting beam, said brackets being made of aluminum.

24. The vehicle seat according to claim 23, wherein said brackets are milled from aluminum.

25. The vehicle seat according to claim 1, wherein said seat bottom includes a seat pan.

26. The vehicle seat according to claim 25, wherein said seat pan is made of carbon-fiber reinforced plastics.

27. The vehicle seat according to claim 25, wherein said pan has a cushion of elastomeric material.

28. The vehicle seat according to claim 25, wherein said seat pan has an upper surface with a ramped depression.

29. The vehicle seat according to claim 25, wherein said seat pan has a stow-away.

30. The vehicle seat according to claim 25, wherein:

said supporting beam has a contour; and said seat pan has a recess formed therein matching said contour of said supporting beam and holds said supporting beam in said recess when said seat bottom is in the second position II.

31. The vehicle seat according to claim 25, wherein said seat pan has a recess formed therein for receiving said brackets.

32. A row of vehicle seats, comprising a plurality of vehicle seats according to claim 1, wherein said vehicle seats are disposed abreast along a common supporting beam.

33. The row of vehicle seats according to claim 32, wherein said plurality includes exactly three of said vehicle seats.

* * * * *